Sept. 13, 1927.
H. PERROT
BRAKING OF THE STEERING WHEELS OF VEHICLES
Filed July 24, 1922
1,642,084
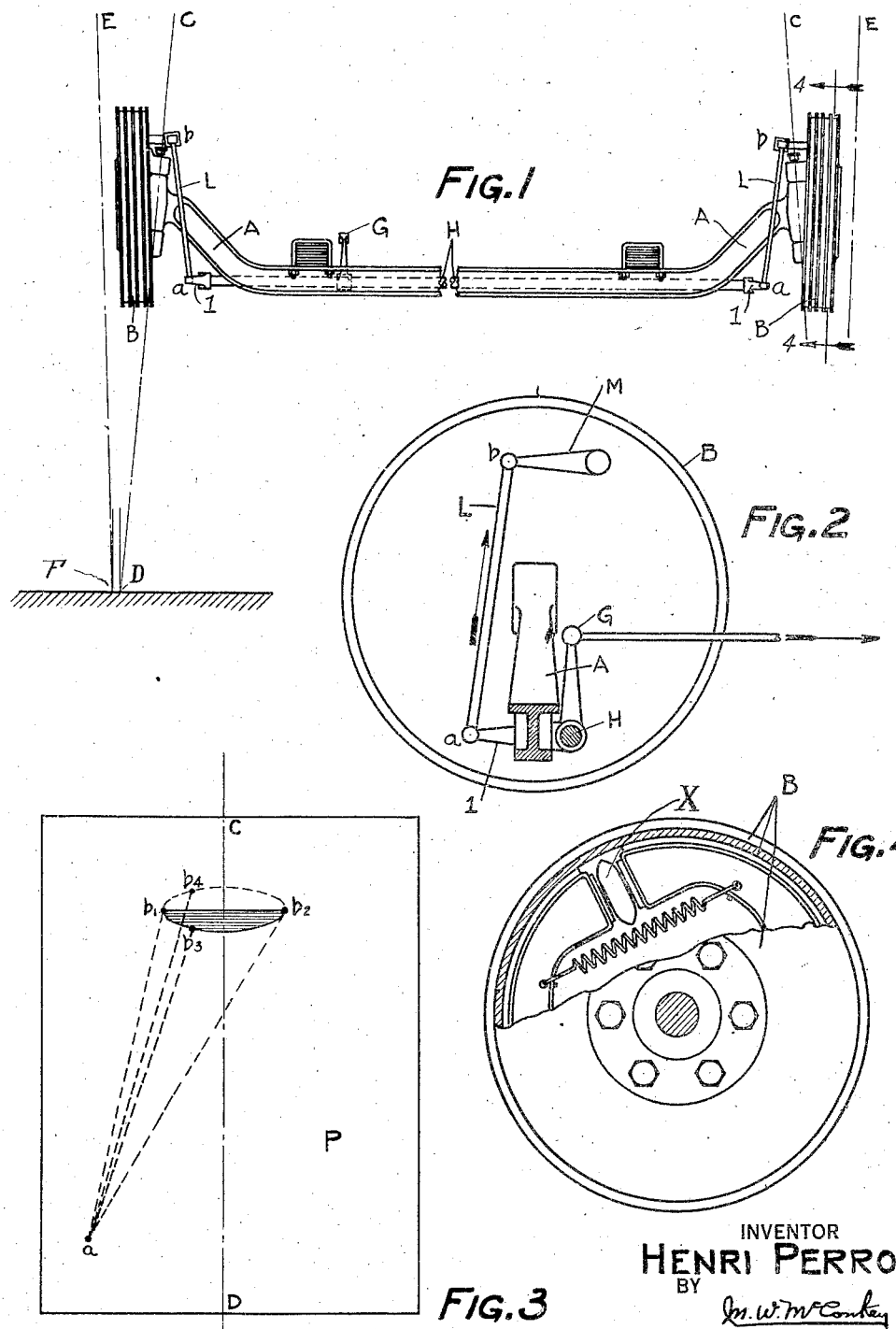
INVENTOR
HENRI PERROT
BY
M. W. McConkey
ATTORNEY Patented Sept. 13, 1927.

1,642,084

UNITED STATES PATENT OFFICE.

HENRI PERROT, OF PARIS, FRANCE, ASSIGNOR TO BENDIX CORPORATION, OF CHICAGO, ILLINOIS, A CORPORATION OF ILLINOIS.

BRAKING OF THE STEERING WHEELS OF VEHICLES.

Application filed July 24, 1922, Serial No. 577,201, and in France September 7, 1921.

It is recognized that one important condition in the braking of front wheels consists in the fact that the pivoting axes of the steering wheels shall meet with the ground at the point of contact of said wheels with the ground or at a point very near the same.

The present invention affords an easy realization of this condition, and is essentially characterized in that the brake is operated by a lever connected with the brake pedal or hand lever and rotating a horizontal shaft whereon is mounted a second lever disposed at right angles to the first and actuating through the medium of a rod the arm controlling the brake expander cam.

A very important feature of the invention relates to arranging the operating mechanism of a set of front wheel brakes in such a manner that the action of the two brakes is differentiated in rounding a corner, preferably by relieving the pressure on the outer brake, to guard against possible locking and skidding of the wheels. In one desirable arrangement the relief in pressure is caused automatically by relative movement of two parts of the connections, caused by their arrangement with respect to the pivoting axis of the wheel, one of the parts pivoting with the wheel and the other not.

The following description, together with the accompanying drawings which are given by way of example, sets forth this invention.

Fig. 1 is a front elevational view, with respect to the brake drum, of a brake control device for steering wheels, and Fig. 2 a corresponding side elevational view, partly in section, of the same.

Fig. 3 is a diagram showing the effects obtained by the device according to the position given by construction to the upper end of the connecting rod.

Fig. 4 is a partial section through the brake, showing the operating cam.

In Figs. 1 and 2, A represents the body of the axle, B the brake drum, C, D the pivot or swivelling axis of the wheel and E, F the wheel plane. The brake is controlled by the lever G which is connected with the brake pedal or hand lever. The lever G actuates shaft H having mounted thereon at each end a lever I which drives by means of rod L the arm M which is connected with the brake expander cam X. The point $b$ at the upper end of rod L describes a circular arc about the pivot axis C, D of the wheel when the wheels are steered; said point $b$ may be disposed by construction in various positions with respect to the plane P by suitably varying the lengths and angles of arms I and M.

Assume the plane P, Figure 3, is the plane containing the pivot axis CD of the wheel and the lower end $a$ of rod L, and assume the point $b$ at the upper end of rod L and situated in this plane P on the same side of axis CD as $a$ so that it will occupy a position designated in the diagram of Figure 3 as $b^1$. In the arrangement shown, rod L is subjected to compression,—it is moved upwardly,—in applying the brake. Now when the wheel is swivelled about its axis CD in steering, the joint at $b^1$ will be swung in a circle whose center is in the axis CD, and which is in a plane at right angles to that axis, and which is illustrated by the circle $b^1$—$b^3$—$b^2$—$b^4$ in Figure 3.

Since the distance from $a$ to $b^1$ is less than the distance from $a$ to any other point on the circle, the swinging of $b^1$ in either direction will decrease the compression on rod L and release the brake. Therefore, when the joint is at $b^1$ when the wheel is directed straight ahead, turning the two front wheels in either direction will release both front brakes.

On the other hand if the joint is at $b^2$ when the wheel is directed straight ahead, in plane P but on the opposite side of axis CD from $a$, swivelling the wheels in either direction would increase the pressure on both brakes, since the distance from $a$ to $b^2$ is greater than from $a$ to any other point on the circle. This arrangement is not usually desirable in practice.

If when the wheel is directed straight ahead the joint $b$ is at some point $b^3$, on the opposite side of the axis CD from the wheel, and since the front of the car is at the left in Figure 3, swivelling the wheel to place it on the outer side of a turn will swing joint $b$ along the circle from $b^3$ toward $b^2$, thus decreasing the pressure on the brake, while swivelling the wheel in the opposite direction to place it on the inner side of the turn will swing joint $b$ along the circle from $b^3$ toward $b^1$, thus increasing the pressure on the brake. This is the condition which I prefer in practice, as it retains the brakes on the two rear wheels and on the inside front wheel, while releasing the brake on the outside front wheel to prevent any possibility of locking that wheel on a corner.

Finally, if the joint is at $b^4$, some point on the circle between the wheel and the axis CD, the reverse action takes place, the outer brake being tightened and the inner brake released.

The main advantages which are obtained by the disposition according to this invention, as concerns the position of the point $b$ at the top of the rod L which is given by the construction, are firstly, the feasibility of an equal distribution of the braking effort upon each wheel when the vehicle moves in a straight line; secondly, the braking effort on the inner steering wheel when turning on the road can be automatically increased whilst the braking effort on the outer steering wheel can be diminished, or vice versa; thirdly, the amount of the braking on front wheels can be regulated with respect to the rear wheels. On the other hand, the compensating bar between the front wheel brakes can now be eliminated.

Having now described my invention, what I claim as new and desire to secure by Letters Patent is:

1. The combination with a pair of steering wheels of a vehicle, of devices for braking the respective wheels equally when the wheels are moving straight ahead, said devices being disposed so that the actions of said devices are automatically differentiated in turning, each of said devices including a part which swivels with the wheel and a part not swivelling with the wheel and a joint connecting said parts and offset from the steering axis of the wheel to cause the differentiation in turning, substantially as described.

2. The combination with a pair of steering wheels pivotally mounted on an axle of a vehicle, of means for braking the respective wheels equally when the wheels are moving straight ahead and for automatically differentiating, in turning, the braking effect of the front wheels with respect to each other, said means including brake shoes and a revoluble cam adapted to separate the shoes, an arm disposed on the shaft of said cam and which arm swivels with the wheel, a connecting rod pivoted to said arm offset with respect to the wheel pivot axis and a horizontal revoluble shaft not swivelling with the wheel and operating said connecting rod.

3. The combination with a pair of steering wheels pivotally mounted on an axle of a vehicle, of means for braking the said wheels, said means including brake drums on the wheels, a brake housed within each drum and a cam adapted to cause said brake to engage the drum, a crank arm without the drum operatively connected to the cam, an operating shaft carried by the axle, and a connecting rod between each of said crank arms and the operating shaft.

4. The combination with a pair of steering wheels pivotally mounted on an axle of a vehicle, of means for braking the said wheels, said means including brake drums on the wheels, a brake mounted within the periphery of each drum and a cam adapted to cause said brake to engage the drum, a crank arm mounted exterior to the drum but operatively connected to the cam, an operating shaft carried by the axle and rods extending in a vertical direction connected between the said crank arms and operating shaft, the arrangement being such that the joint at one end of each rod is adjacent the axis of the steering pivot.

5. The combination with a pair of steering wheels pivotally mounted on an axle of a vehicle, of means for braking the said wheels, said means including brake drums on the wheels, a brake inside each drum, a device inside each drum for acting on said brake to cause it to engage the drum, a crank arm mounted exterior of the drum but operatively connected to said device, a shaft carried by the axle, and a rod extending in a vertical direction connected between the said crank arm and operating shaft.

6. In a steering wheel for a motor vehicle, a braking device having an actuating cam, and a mechanism adapted to control the actuating cam of the braking device, comprising in combination an arm adapted to directly operate said cam and arranged to swivel with the wheel, a connecting rod pivoted at one end to said arm, and means not swivelling with the wheel and actuating the other end of said connecting rod, the first end of said connecting rod swinging in an arc about the pivoting axis of the wheel when braking.

7. In a steering wheel for a motor vehicle, a braking device having an actuating cam, and a mechanism adapted to control the actuating cam of the braking device, comprising in combination an arm adapted to directly operate said cam, a connecting rod pivoted at one end to said arm, and means for actuating the other end of said connecting rod, the first end of said connecting rod being out of the plane determined by its other end and the pivoting axis of the wheel, when running in a straight line.

8. In a steering wheel for a motor vehicle, a braking device having an actuating cam, and a mechanism adapted to control the actuating cam of the braking device, comprising in combination an arm adapted to directly operate said cam, a connecting rod pivoted at one end to said arm, a revoluble shaft carried by a fixed part of the vehicle, a lever on said shaft and pivoted to the other end of said connecting rod and means for rotating said revoluble shaft, the first end of said connection rod being out of alignment with the pivoting axis of the wheel when braking.

9. The combination with a pair of steering wheels pivotally mounted on an axle of a vehicle, of means for braking the said wheels, said means including brake drums on the wheels, a brake housed within each drum, a brake operating means adapted to cause said brake to engage the drum, a crank arm without the drum operatively connected to said brake operating means, an operating shaft carried by the axle and a connecting rod between each of said crank arms and the operating shaft.

10. The combination with a pair of steering wheels pivotally mounted on an axle of a vehicle, and a pivot pin connecting each wheel to the axle, of means for braking the said wheels, said means including brake drums on the wheels, a brake in operative relationship to each drum, a brake operating means adapted to cause each brake to engage the drum, a crank arm mounted outside the drum but operatively connected to said brake operating means, an operating shaft carried by the axle and having a lever, and a connecting rod between said crank arm and lever having a joint with the crank arm having at least one position in line with said pivot pin.

11. A braking system for a vehicle having a brake and a brake operating device swivelling with the front wheel and comprising, in combination, a rockshaft not swivelling with the wheel, and a connection from the rockshaft to the brake-operating device including a swivel joint so constructed and so arranged with respect to the steering axis of the wheel as to vary the braking action automatically when the wheel is swivelled about the steering axis.

12. A braking system for a vehicle having a brake and a brake-operating device swivelling with the front wheel and comprising, in combination, a rockshaft not swivelling with the wheel, and a swivel joint connecting the rockshaft and the brake-operating device, the joint being so arranged with respect to the steering axis of the wheel as to decrease the braking action when the wheel is swivelled in one direction and increase it when the wheel is swivelled in the other direction.

13. A braking system for a vehicle having two front wheels with brakes operated without equalization, and including brake-operating devices swivelling with the wheels and operating means not swivelling with the wheels, and connections between said devices and said means including parts so arranged with respect to the steering axes that when the wheels are swivelled in steering the outer brake is released and the inner brake is tightened.

14. A braking system for a vehicle having two front wheels with brakes operated by the same rockshaft without equalization, and comprising, in combination with the rockshaft, brake-operating devices swivelling with the wheels with respect to the rockshaft, and connections to both devices from the rockshaft including swivel joints so arranged with respect to the steering axes of the wheels that the action of the two brakes is differentiated in rounding a corner.

15. A braking system for a vehicle having front wheels with brakes operated by unequalized connections and including, in said connections and in combination with brake-operating devices swivelling with the wheels and parts which do not swivel with the wheels, swivel joints moved bodily by the swivelling of the wheels with respect to said parts and reacted on by said parts to vary the braking effect.

16. Connections for operating a brake on a wheel swivelling about a substantially vertical steering axis, and comprising, in combination, a lever swivelling with the wheel, a lever operated by the driver and not swivelling with the wheel, and a rod connecting the levers and pivoted to one of them between the steering axis and the wheel to increase the braking effect when the wheel is on the inside of a turn and decreases it when the wheel is on the outside of a turn.

17. Brake mechanism comprising, in combination, a swivelled wheel having a brake, and brake-operating connections including a part swivelling with the wheel and a non-swivelling part engaging each other at one side of the swivelling axis in such a manner that swivelling the wheel to place it on the outer side of a turn tends to move the swivelling part away from the non-swivelling part to relieve the pressure on the brake.

18. Brake mechanism comprising, in combination, a swivelled wheel having a brake, and brake-operating connections including a lever swivelling with the wheel and a non-swivelling pivoted lever having a connecting part engaging the swivelling lever at one side of the swivelling axis, in such a manner that swivelling the wheel to place it on the outer side of a turn tends to move said swivelling lever away from said connecting part, which is held by the non-swivelling lever, to relieve the pressure on the brake.

19. A vehicle having two swivelled front wheels, each having a brake swivelling therewith, and comprising, in combination therewith, a brake-operating shaft not swivelling with the wheels and connections from the shaft to the two front brakes, said connections including parts moved by the swivelling of the wheels to decrease the pressure on the one brake and parts moved to increase the pressure on the other brake.

20. A vehicle having two swivelled front wheels, each having a brake swivelling therewith, and comprising, in combination therewith, a brake-operating shaft not swivelling with the wheels and connections from the shaft to the two front brakes, said connections including parts moved with respect to each other by the swivelling of the wheels to decrease the pressure on the brake on the outside of the turn.

21. A vehicle having two swivelled front wheels, each having a brake swivelling therewith, and comprising, in combination therewith, a brake-operating shaft which does not swivel with the wheels and connections from the opposite ends of the shaft to the two front brakes, said connections including parts moved by the swivelling of the wheels to decrease the pressure on the brake on the outside of the turn.

22. A vehicle having two swivelled front wheels, each having a brake swivelling therewith, and comprising, in combination therewith, non-equalized driver-controlled operating connections for the two brakes including non-swivelling parts and parts swivelling with the wheels and which are moved with respect to each other by swivelling the wheels in steering to vary the pressure on at least one brake.

23. A vehicle having two swivelled front wheels, each having a brake swivelling therewith, and comprising, in combination therewith, non-equalized driver-controlled operating means for the two brakes including non-swivelling parts and parts swivelling with the wheels and which are caused to move with respect to each other by swivelling the wheels in steering to relieve the pressure on the outer brake.

In testimony whereof I have signed my name to this specification.

HENRI PERROT.